May 1, 1962 W. F. SZABO ET AL 3,032,146
MAGNETIC BRAKES
Filed April 1, 1958 7 Sheets-Sheet 1

INVENTOR.
William F. Szabo
David A. Collings
BY John A. Cortelli

Harry R. Canfield
Attorney

INVENTOR.
William F. Szabo
David A. Collings
BY John A. Cortelli

Harry A. Canfield
Attorney

INVENTOR.
William F. Szabo
David H. Collings
BY John H. Cortelli

Harry P. Canfield
Attorney

INVENTOR:
William F. Szabo
David A. Collings
BY John A. Cortelli
Harry C. Canfield
Attorney

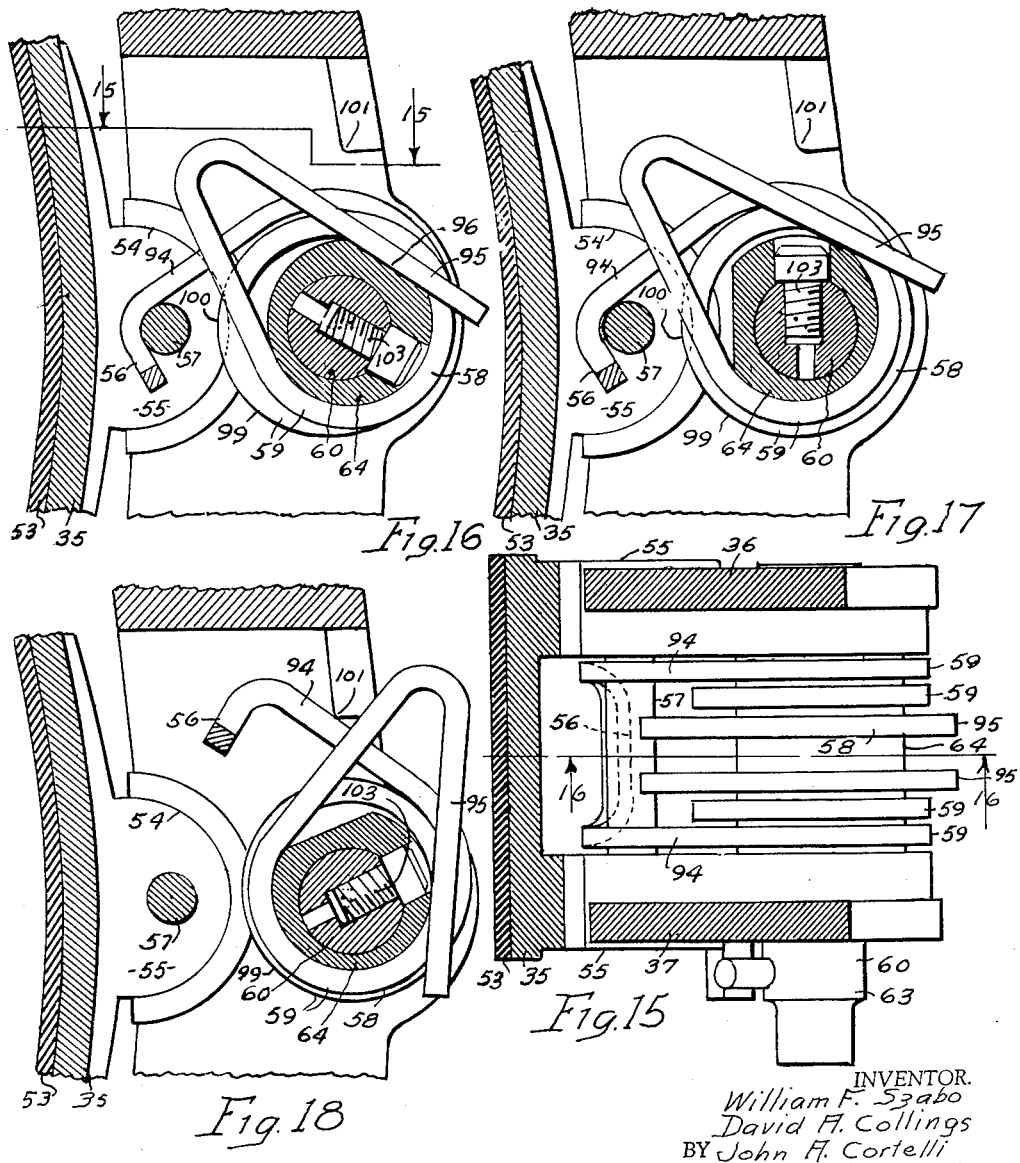

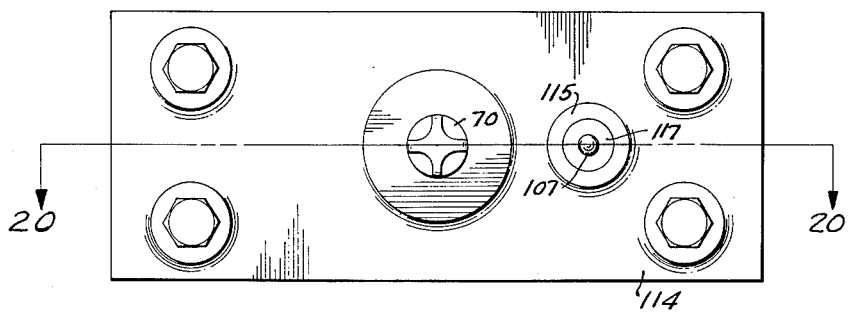
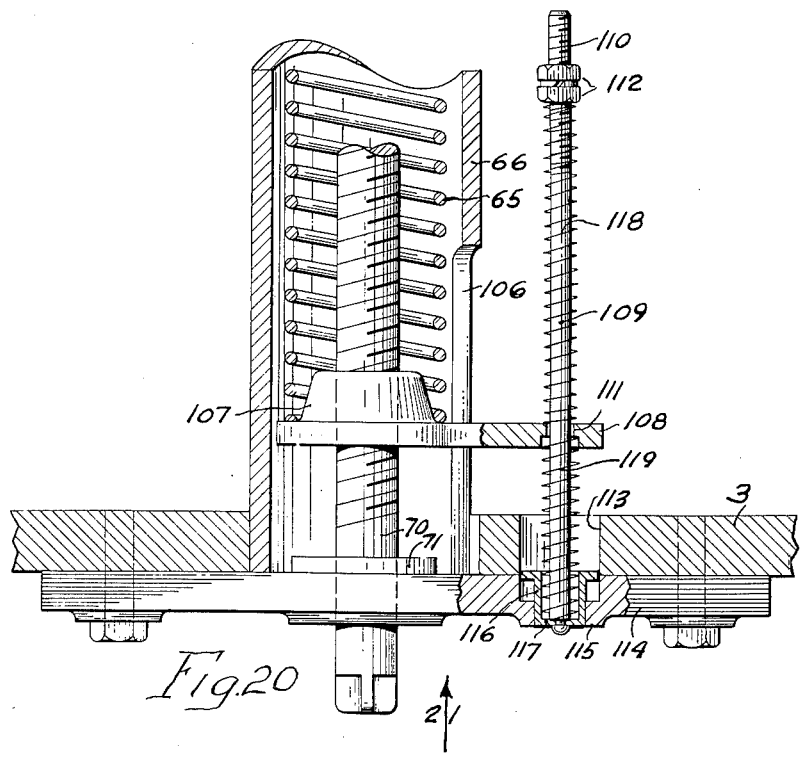

3,032,146
MAGNETIC BRAKES
William F. Szabo and David A. Collings, Cleveland, and John A. Cortelli, Gates Mills, Ohio, assignors to The Clark Controller Company, Cleveland, Ohio, a corporation of Ohio
Filed Apr. 1, 1958, Ser. No. 725,656
10 Claims. (Cl. 188—171)

The invention hereof relates to brakes of the general class in which a main spring causes a brake shoe to be moved into frictional engagement with a rotary brake drum to brake its rotation, and where said brake shoe is released therefrom by the energization of an electromagnet.

The present embodiment of the invention comprises a pair of upright arms in spaced apart relationship and having brake shoes to be positioned on either side of the drum. An electromagnet bolted on the main frame comprises a cup form steel casing having a core therein. An insulated winding is secured around the core by bolts and is molded to fit tightly within the casing to facilitate the dissipation of heat from the winding.

An armature is pivotally suspended at its upper end from an upper portion of the main frame and positioned forwardly of the front of the casing by a working air gap. One of the upright arms is pivotally connected at its bottom to the bottom of the armature and the other upright arm is pivotally connected at its bottom to the main frame. The upper ends of the upright arms are connected together by a tie rod.

The main spring which moves the brake shoes to engage the drum to set the brake is disposed in a housing on the main frame below the magnet casing with the forward end of the spring engaging the lower end of the armature.

The tension of the spring is adjusted by a traveling nut on a stud which extends into the rear end of the spring. The housing closely surrounds the spring to prevent dirt or other foreign material from accumulating on the spring or in its convolutions. Also, if the spring should break, the pieces are retained in substantial alignment and thus will continue to exert at least a partial braking force.

By mounting the electromagnet above and independent of the spring, as described, the electromagnet can be removed without releasing the brake or disturbing the adjustment of the spring.

When the electromagnet is de-energized, the main spring moves the armature away from the magnet, and by means of the brake mechanism, moves both shoes into braking engagement with the drum, and introduces the working air gap between the armature and the casing.

When the electromagnet is energized, the armature is retracted to close the air gap, and the movement of the armature acting through the brake mechanism moves the shoes out of the braking engagement, to introduce shoe clearance between the drum and shoes. Adjustment means is provided to initially establish this clearance, and to re-establish it when the lining is worn.

At times, it is desired to release the brake manually, that is, without using the electromagnet. This is accomplished by positioning a cam carried by a shaft rotatably on the main frame adjacent to the lower end of the armature and opposite to the main spring. When the shaft is turned, the cam engages and moves the armature against the bias of the main spring. The cam moves the armature far enough to release the shoes, but leaving a small air gap. The cam is then returned automatically to its out of use position by a return spring when the electromagnet is energized.

As described, the braking torque exerted on the drum will depend upon the adjustment of the main spring, which can be changed by propelling the traveling nut in one direction or the other. Since the spring is hidden, a visible indicator is provided to indicate the spring adjustment. The indicator is made adjustable so it can be set at zero when the spring is adjusted to develop the brake's rated torque.

A second visible indicator is provided to indicate the clearance between the shoes and the drum when the brake is set. It also serves to indicate the proper clearance when the clearance is re-established.

An adjustment is also provided to shift the brake shoes, in unison, to equalize their clearances, if their clearance should be unequal when installing the mechanism around the drum of a previously installed motor.

An object of the invention is to provide an improved brake of the class referred to.

Other objects are to provide a brake comprising the aforesaid generally described improved features and their mode of operation, singly or in combination.

An embodiment of the invention is fully described in the following description taken in combination with the accompanying drawing in which:

FIGS. 11 to 18 are views illustrating means for mounting brake shoes on brake mechanism arms of FIG. 1 or FIG. 5, and of which:

FIG. 11 is a front elevational view of part of FIG. 5 to enlarged scale;

FIG. 12 is a fragmentary elevational view taken from the plane 12—12 of FIG. 11;

FIG. 13 is an elevational view taken approximately from the plane 13—13 of FIG. 11;

FIG. 14 is a sectional view from the plane 14—14 of FIG. 11;

FIG. 15 is a sectional view from the plane 15—15 of FIG. 11 and the view may be referred to the plane 15—15 of FIG. 16;

FIG. 16 is a sectional view from the plane 16—16 of FIG. 15;

FIGS. 17 and 18 are views similar to FIG. 16 with parts in different operative positions.

FIG. 20 is a cross sectional view showing, as a modification, a brake torque indicator which may be employed when wanted;

FIG. 21 is an elevational view taken in the direction of the arrow 21 of FIG. 20.

Figure 1:
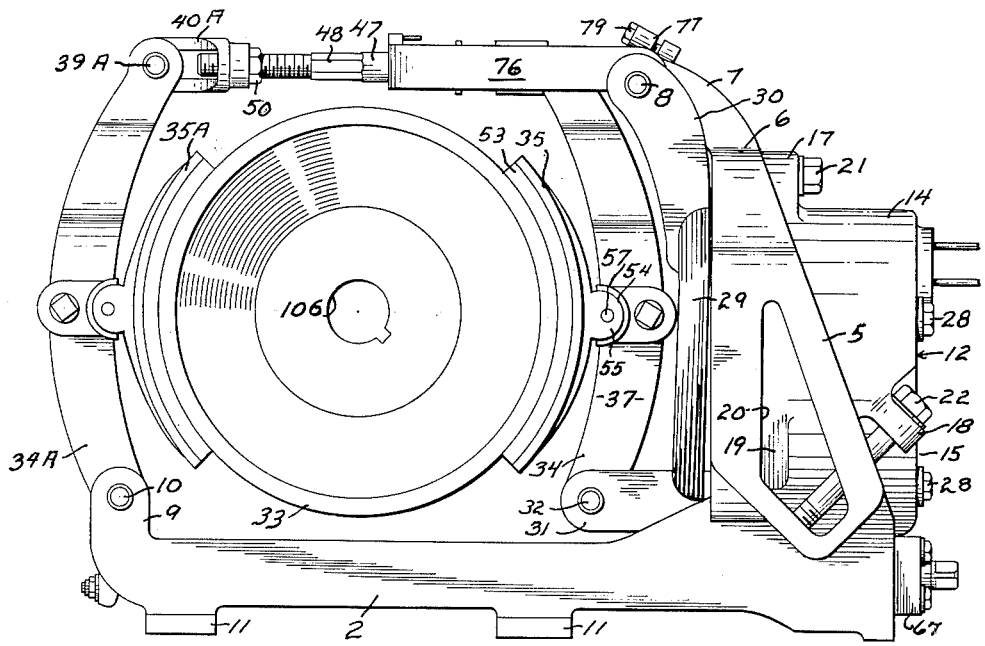
FIG. 1 is front elevational of the embodiment; and showing, additionally, a brake drum.

Referring to the drawing there is shown a rigid main frame comprising spaced apart parallel elongated bottom side rails 2—2 connected by a transverse end wall 3 at the right end and a tie member 4 at the left end.

Upright posts 5—5 rise from the respective side rails at their right ends, wide at their lower ends for rigidity, tapering upwardly and connected together at upper portions by a transverse arch 6, from which spaced curved arms 7—7 extend upwardly and toward the left and have in their ends transversely aligned bores to support a bearing pin 8.

At the left ends of the side rails respectively are short upright posts 9—9 having in their ends transversely aligned bores supporting a bearing pin 10.

The rails 2—2 have laterally extending feet 11—11 with holes therein for bolts to bolt the frame to a floor or other support when installed for use.

All of the aforesaid parts are formed as a one piece steel casting or two castings welded together to form one piece.

At the right end of the frame is the brake magnet 12. It comprises a casing 13 in the form of an outer cylindrical wall 14, on a horizontal axis, the left end being open and in a vertical plane and constituting one pole of the magnetic circuit; the right end being closed by an integral end wall 15; and a coaxial core 16 integral with the end wall, with its forward end in the plane of the casing wall and constituting the other pole of the magnet; all of these parts being formed as a single piece steel casting.

The casing wall 14 has a lug 17 on its top, and a pair of opposite lugs 18—18 near its lower side.

Figures 6, 7:
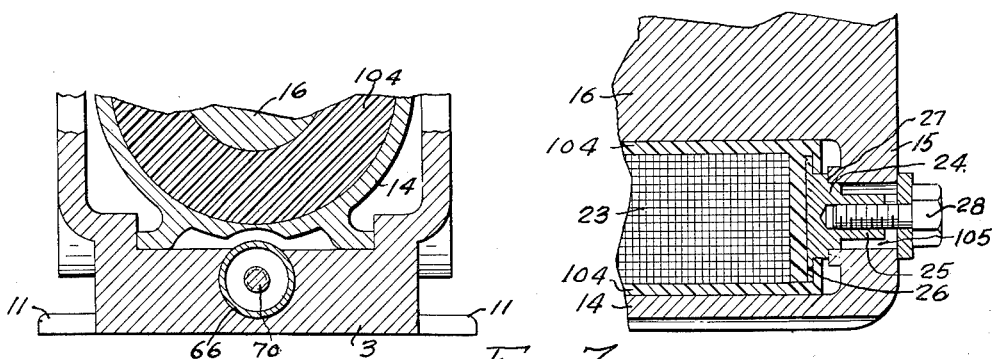
FIG. 6 is a fragmentary sectional view to enlarged scale of a part of FIG. 5.
FIG. 7 is a sectional view to reduced scale taken from the plane 7—7 of FIG. 5.

The upper portion of the casing wall 14 extends under and adjacent to the said arch 6 and between the said posts 5—5 and rests upon the right end wall 3 of the frame see FIG. 7, and has a pair of flanges 19—19, see FIGURE 1, on its opposite sides projecting into openings 20 in the posts, only one opening and flange being shown.

The top lug 17 abuts forwardly upon the arch 6 and is secured thereto by a bolt 21 going through the lug 17 and screwed into the arch.

The flanges 19—19 abut forwardly on the sides of the openings 20—20 in the posts, and long bolts 22—22 go through holes in the side lugs 18—18 in a downwardly inclined direction and are screwed into the main frame.

The magnet casing is thus positioned longitudinally of the frame by the top lug 17 and flanges 19 with its forward open end in a vertical plane as referred to, and rigidly bolted to the frame in that position.

The magnet winding 23 is a self contained unit, form wound, and impregnated interiorly, and coated on its exterior surfaces, with solidified epoxy resin compound 104 to insulate it and the coating on the exterior surfaces is molded to fit with the minimum of clearance within the cylindrical outerwall 14 of the magnet casing and around the central core 16 therein, so that heat from the winding may be freely conducted into the casing and be radiated away therefrom.

Attaching devices 24 of metal see FIG. 6 in the form of bushings 25 with end flanges 26 have their flanges embedded in the exterior coating on the rear end of the winding. The bushings 25 are interiorly threaded, and axially aligned with holes 105 in the rear wall 15 of the magnet casing, and has annular shoulders 27 overlapping the peripheries of the holes, on the inside. Screws 28 are projected through the back wall holes 105 from the rear and screwed into the bushings 25 and draw the shoulders 27 tight against the inside of the back wall 15 of the casing and thereby detachably mount the winding 23 rigidly as a unit within the casing.

Figure 2:
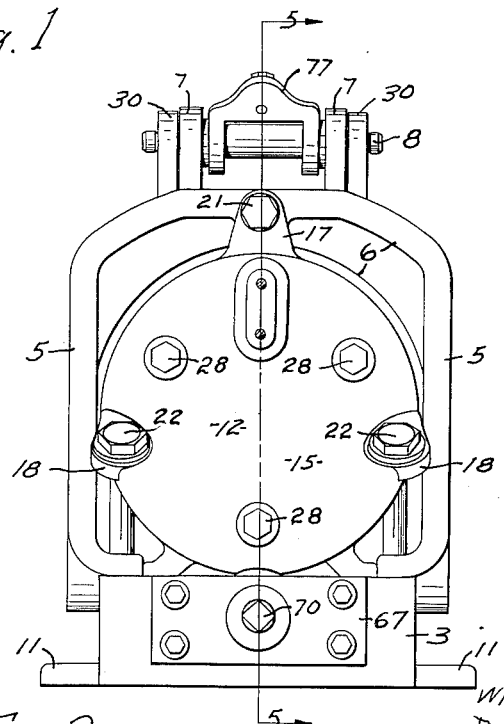
FIG. 2 is an elevational view taken from the right side of FIG. 1.
Figure 5:
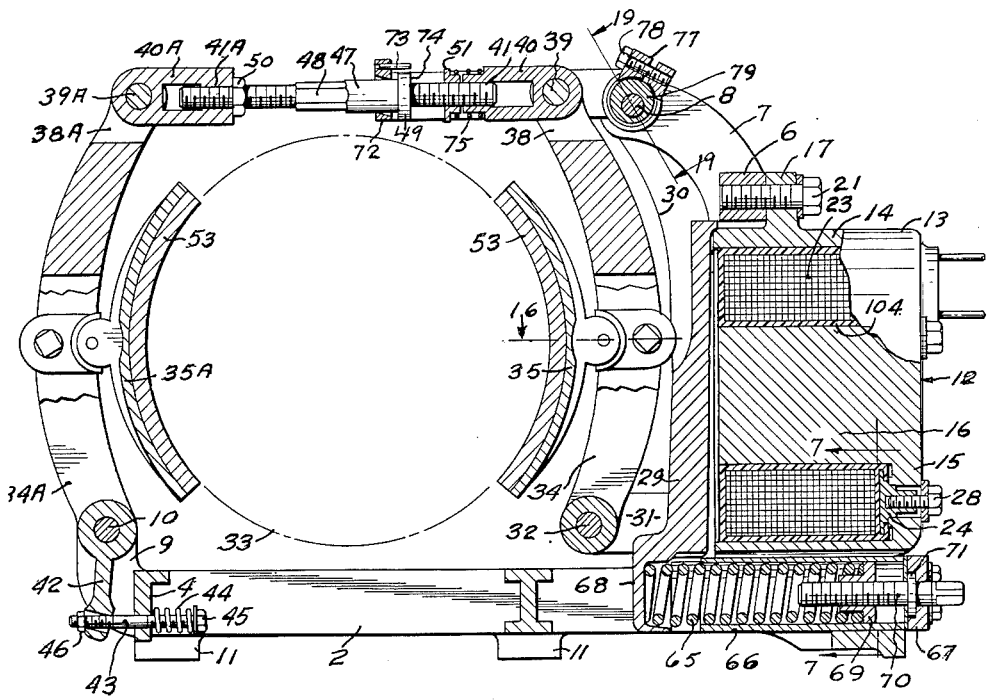
FIG. 5 is a cross sectional view, taken from the plane 5—5 of FIG. 2 with some of the parts in front elevation.

Only one of these attaching devices 24 is shown in FIGS. 5 and 6, but it will be understood that others for example three, may be provided at spaced points around the rear end of the winding, as indicated by the bolts 28, FIG. 2.

A magnet armature 29 has a circular disc like body directly in front of the magnet casing 13, provided with spaced arms 30—30 on its upper edge, pivoted on the bearing pin 8, and spaced arms 31—31 on its lower edge extending forwardly therefrom and having a transverse bearing pin 32 in aligned bores therein.

The brake drum 33 whose rotation is to be braked is keyed to the shaft at 106 of a motor not shown. A pair of upright lever arms 34 and 34A at the right and left sides of the drum 33, are pivoted respectively at their lower ends upon the aforesaid armature pin 32 and frame pin 10; and at their middle portions carry brake shoes 35 and 35A to be described.

Figure 3:
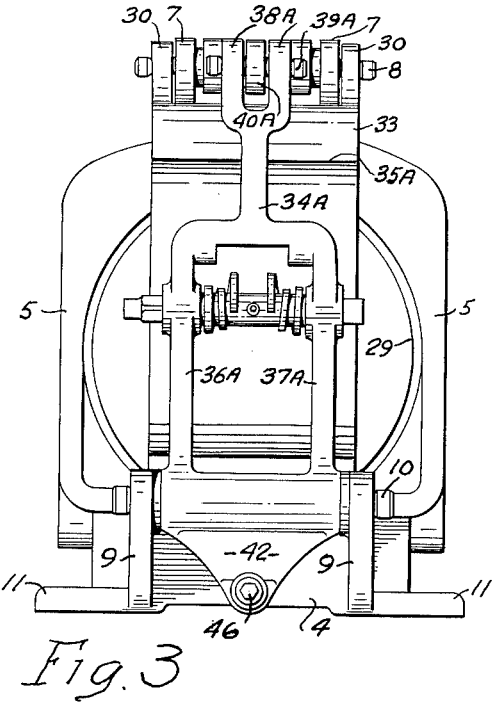
FIG. 3 is an elevational view taken from the left side of FIG. 1.
Figure 4:
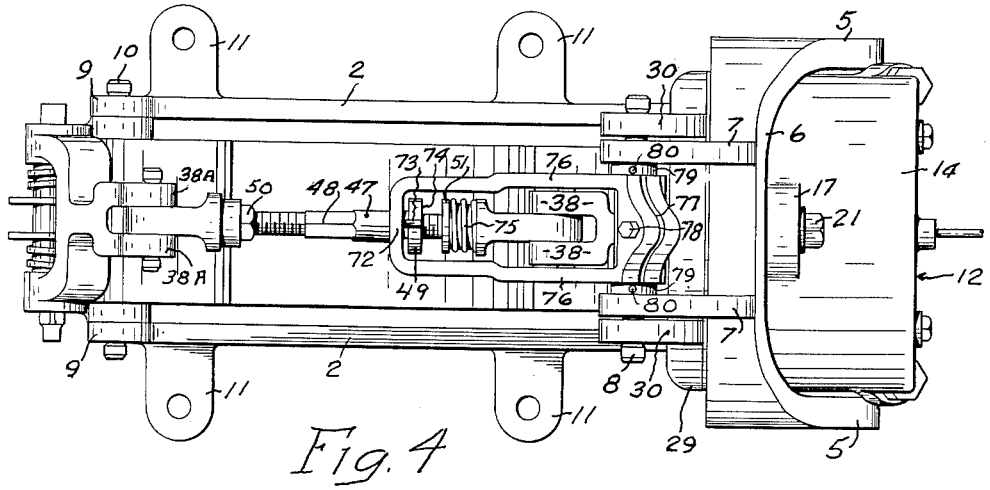
FIG. 4 is a plan view taken from the upper side of FIG. 1.

The lever arms 34—34A are in general alike and the right arm 34 will here be described, the same description applying to the left arm 34A with reference numerals having the suffix A. The arm 34 has two parallel spaced apart branches 36—37 pivoted at lower ends on the armature pin 32, see FIG. 3 for the arm branches 36A and 37A, giving the arm width and stability.

The branches unite at a point above the middle of the arm, and the upper end of the arm has bifurcations 38—38 in which is a bearing pin 39 in transversely aligned bores; and a horizontal elongated tubular nut element 40 has one end pivoted on the pin 39 and extends toward the left therefrom, and the left end is internally threaded with left hand threads as at 41.

Parts of the left arm 34A that are like corresponding parts of the right arm 34 are given the same reference characters with suffix A. These include arm branches 36A—37A pivoted below on the pin 10; bifurcations 38A at the upper end; a bearing pin 39A; an elongated nut element 40A pivoted on the pin 39A, extending toward the right therefrom and internally threaded with right hand threads at 41A.

A difference in the left arm 34A is that it has a finger 42 extending below the pin 10; and a bolt 43 passes freely horizontally through a large aperture in the end of the finger and on through an aperture in the frame tie member 4; and a compression spring 44 surrounds the bolt inwardly of the tie member 4 and reacts between a head 45 of the bolt and the frame tie member 4; and the other end of the bolt has a threaded nut 46 thereon outwardly of the finger; whereby the spring 44 by means of the bolt exerts torque on the arm 34A tending to rock it away from the drum and tending to move its upper end toward the left.

A horizontal adjustment tie rod 47 is provided having left and right threads on its opposite ends screwed into the nut elements 40 and 40A respectively; and the middle of the tie rod is hexagonal as at 48 to receive a wrench for turning it, for adjusting purposes to be described.

The tie rod 47 has a circular collar 49 thereon between the threaded ends of the rod, to be referred to.

It is important to keep the tie rod 47 from being turned from its adjusted rotational position by vibration or other causes, and to this end a hexagonal lock nut 50 on the right hand threads 41A of the tie rod may be screwed up tight or jammed against the tubular nut element 40A. This will lock the rod from turning in one direction; but as is well known the nut may become loose if the rod tends to rotate in the other direction.

Another lock nut 51 is accordingly provided on the left hand threads 41 of the rod, but in this case is not jammed against the tubular nut element 40, because if it were, then when attending personnel wanted to loosen it to adjust the rod, they would attempt to turn it in the direction in which lock nuts are commonly turned to loosen them, but because of the left hand threads, this would tighten it; and if great torque were applied to it to force it to turn, the threads might be mutilated.

To prevent this the lock nut 51 is made circular to indicate that it is not to be manually turned like an ordinary lock nut; and is spaced from the inner end of the nut element 40; and a compression spring 75 around an end portion of the nut element reacts between it and the lock nut 51, and keeps the lock nut from turning. The friction thus produced on the threads of the tie rod and nut, will lock the tie rod from turning in said other direction by vibration or the like, but permit it to be forcibly turned for adjustment purposes.

The brake shoe 35 has the usual brake lining 53 on its front side, and at its back side is mounted on the lever arm 34 by a rotary bearing having an axis parallel to the drum axis.

This connection of the shoe 35 with the arm 34 constitutes the subject matter of another patent application, now Patent Number 2,933,163 which issued on April 19, 1960 as mentioned hereinbefore, and reference may be had thereto for a full description of its construction and mode of operation, and a briefer description in connection with FIGS. 11 to 18, will suffice here.

The bearing construction comprises a pair of axially aligned part cylindrical recess 54—54 in the forward edges of the two branches 36—37 of the lever arm 34; and two corresponding spaced part cylindrical protuberances 55 on the back of the shoe 35, nested in the recesses, and held therein under pressure by a spring retracted hook 56, hooked over a horizontal pin 57, bridging the shoe protuberances, the pressure creating friction at the nested surfaces.

The friction allows the shoe to rotatively tip up or down to make perfect braking contact of the lining with the brake drum when forcibly engaged with it, but prevents tipping of the shoe downwardly by gravity when moved away from the drum, for the purposes mentioned hereinbefore.

The said spring, shown generally at 58, has generally circular convolutions 59 in the space between the branches 36—37 of the arm, surrounding a horizontal shaft 60 which spans the arm branches, and has rotary bearings 61—62 therein; one end of the shaft as at 63 projecting out of its bearing and formed to receive a tool for turning it. The shaft 60 has an eccentric cam 64 thereon within the spring convolutions, secured thereon by a screw 103.

Figure 14:
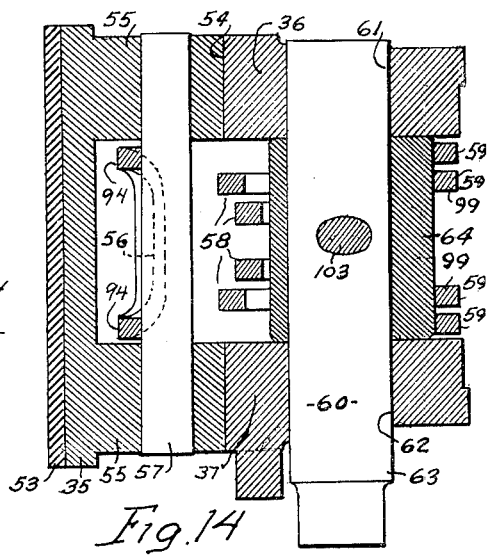

The cam 64 fills the space between the arm branches 36—37 as shown in FIG. 14 and prevents endwise shifting of the shaft 60; and the spring convolutions 59—59 around the cam also fill this space and the spring is thereby prevented from shifting axially.

The convolutions 59—59 at their axially opposite portions continue tangentially into end legs 94—94 which jointly provide the hook 56 at their ends FIGS. 14 and 15, and midway between the end legs, continue tangentially into gripping legs 95—95, resiliently engaged with the cam 64 to cause the spring 58 as a whole to tend to rotate with the shaft 60.

When the shaft 60 is rotated counterclockwise the hook descends and hooks loosely over the pin 57, see FIG. 17.

This stops rotation of the spring as a whole with the shaft.

Upon continued rotation of the shaft, the cam 64 rotates within the spring convolutions and acting on their insides deforms them and they retract the hook 56 into tight latched engagement with the pin 57, and the pin is pulled thereby and pulls the protuberances 55 of the shoe resiliently into said frictional contact with the arm recesses 54—54, see FIG. 16.

In this last rotated position of the cam, the gripping legs 95 of the spring are in contact with a flat surface 96 on the cam, and lock it against accidental rotation.

As described, and as shown in FIGS. 14, 15, 16, the hook-carrying end legs 94 at the axial ends of the spring project into the space between the shoe protuberances 55—55 and are disposed adjacent thereto, and prevent axial drifting of the shoe in its bearing recesses.

Upon rotating the shaft clockwise from FIG. 16 to FIG. 17, the cam first releases the hook 56 from the pin 57 and then upon further rotation will lift the hook 56 off of the pin 57 and ultimately free the shoe; and the shoe may then be removed from the arm by sliding it axially on its nested bearing surfaces.

Figure 11:
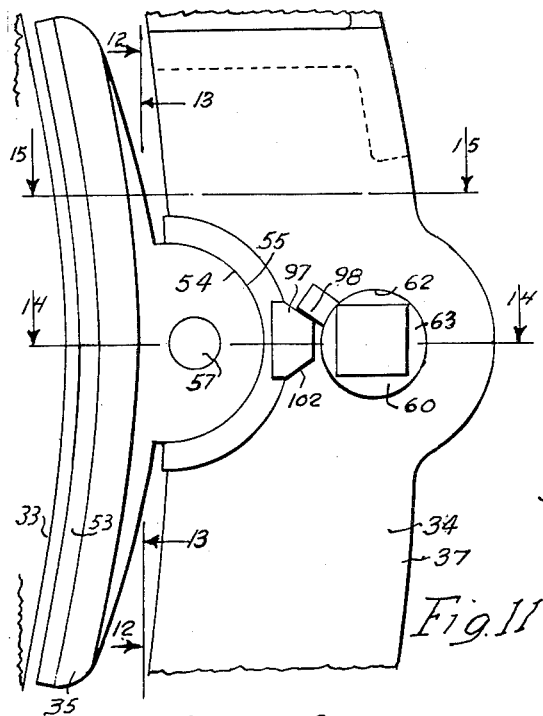

To guide the operator in turning the shaft 60 to the shoe latching position of FIG. 16, a stop surface 97, FIG. 11, is provided on the arm, to be engaged by a pin 98 on the protruding end 63 of the shaft, when full latching has been effected, which insures that the cam and shaft will be locked in that position on the cam flat surface 96 by the gripping legs 95 as described.

In some cases, the operator might inadvertently leave the shaft rotated to a position in which the hook 56 and spring legs 94 barely clear the shoe protuberances 55—55, and in the absence of countervailing provisions the shoe would not only be loose in its bearings and operate abnormally, but might drift axially enough to fall off of the arm.

To prevent this falling off of the shoe, the axially outer spring convolutions 99—99 of the spring see FIGS. 16 and 17, are made of great enough diameter to overlap the shoe protuberances 55—55 as shown at 100, so that while the shoe may come unlatched and be loose it will continue to operate to brake the drum, even if abnormally, and will be prevented by the said overlap 100 from drifting axially enough to fall off of the arm before its abnormal operation is noticed and the defect corrected.

Figure 12:
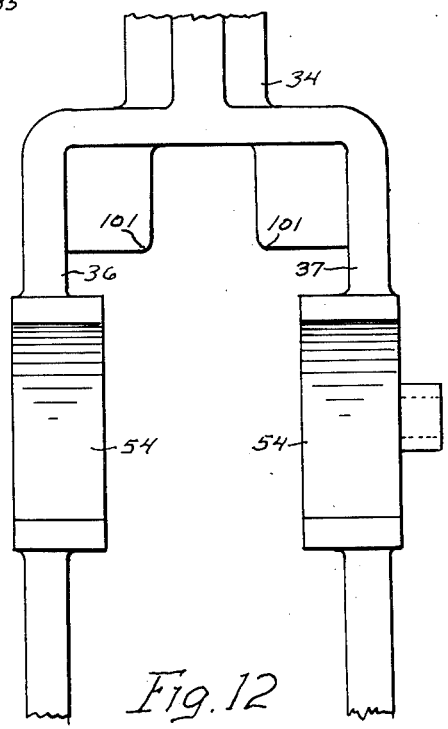
Figure 13:
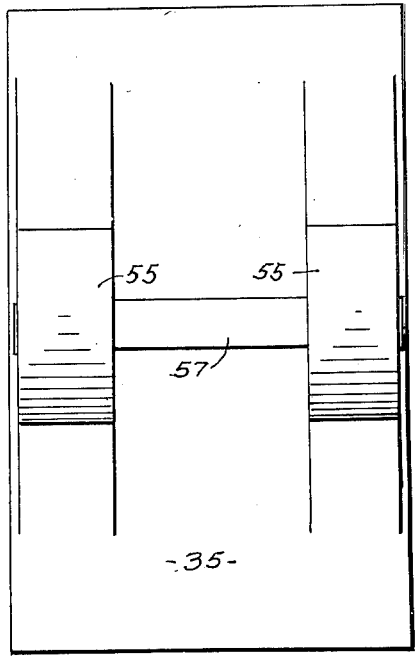

To remove the said overlap at 100, so that the shoe can be removed by sliding it axially as described, the whole spring is rotated by the shaft, freely, until its end legs 94—94 come into contact with shoulders 101—101 on the arm, as in FIG. 12.

This stops free rotation of the spring; and the shaft is then rotated farther forcibly, and the cam 64 acts on the spring convolutions and moves them toward the right as viewed in the drawing until the large convolution 99 eliminates the overlap at 100, see FIG. 18.

To guide the operator in rotating the shaft far enough in this operation, another stop surface 102 is provided on the arm, FIG. 11 engageable by the shaft pin 98.

The left shoe 35A is mounted on the arm 34A in the same manner as the right shoe, above described, the construction of the parts being identified as the same as of those described, by having the same reference characters with the suffix A.

The brake is set, to brake the drum, by simultaneous movement of the brake shoes into engagement with it by a powerful helical main spring 65 under the magnet casing.

The body of the spring is enclosed in a tubular spring housing 66 on the main frame, the rear end of which is closed by a plate 67.

The lower end of the armature 29 extends below the magnet casing 13 and on its lower end is formed a cup-like receptacle 68 into which the forward end of the spring projects and against the cup bottom of which the end of the spring abuts; and the cup 68 constitutes in effect a continuation of the tubular housing 66; so that the spring is entirely surrounded by the tubular housing 66 and cup 68, and dirt or dust which might otherwise accumulate on the spring or between its convolutions and interfere with its operation, are excluded.

The rear end of the spring 65 abuts upon a travelling nut 69 threaded upon the inner end of a stud 70 coaxial with the tubular housing 66 and projecting through the rear end plate 67 in which it has rotary bearing, and a collar 71 on the stud at the inside of the plate, transmits the spring thrust to the plate; and upon turning the stud 70 the nut 69 moves along the stud 70 and the force of the spring exerted upon the lower end of the armature may thereby be adjusted.

Changing the force of the spring by this adjustment will obviously change the pressure of the shoes 35—35A on the drum 33 and therefore change the braking torque.

The spring 65 may be adjusted in this manner to give to the brake a certain chosen rated torque.

An adjustable indicator described below may be provided as shown in FIGS. 20 and 21 which can be adjusted to indicate zero when the spring has been adjusted to give rated torque, and thereafter will indicate deviations of torque from the rated value, so that the spring can be adjusted to restore the torque to the rated value, and the indicator to zero indication.

Referring to FIG. 20, the tubular housing 66 has a longitudinal slot 106 therein for a short portion of its length on one side, and the travelling nut 107 has an arm 108 extending laterally therefrom through the slot.

A rod 109 parallel to the spring adjusting stud 70 has one end portion threaded as at 110 and going through a guide hole 111 in the arm, with locked nuts 112 on the threads, above the arm.

The other end extends into an enlarged cylinder bore 113 in the end wall 3 and the end plate 114 and open outwardly at a clear face 115 on the plate 114.

A cup form element 116 is disposed in the cylinder bore 113 free to slide axially therein, with the cup bottom 117 facing outwardly, and the said other end of the rod 109 is attached to the cup.

A loaded spring 118 surrounds the rod 109 above the arm 108 abutting at opposite ends upon the lock nuts 112 and on the arm 108.

Another loaded spring 119 preferably of larger diameter and weaker than the spring 118, surrounds the rod, abutting at one end on the arm 108 and at its other end going into the cup 116 and abutting upon its bottom 117.

The spring 118 may be shortened or lengthened by adjustably positioning the lock nuts 112 along the rod, and, predominating over the spring 118 will adjustably change the longitudinal position of the rod and the axial position of the cup 116 in the cylinder 113.

The exterior surface of the cup bottom 117 is the movable part of the indicator, and the clear face 115 at the open end of the cylinder bore 113 is the stationary indicator element. When the rod is adjusted in its longitudinal direction, the cup bottom 117 may be projected out of the cylinder beyond the said face 115 or withdrawn inwardly beyond it.

In this manner the cup bottom 117 may be made flush with said face 115 and the end of the bore; and that position of the cup bottom, readily observed, is taken as its zero indicating position.

If for any reason the stud 70 should be turned, thereby causing the torque to depart from its rated value, the travelling nut 107 moved thereby will move the rod 109 and both springs 118 and 119 and the cup form indicator 116 in unison and project the cup bottom 117 out of the bore beyond the face 115 or cause it to retreat into the bore, and thereby indicate the change of torque from rated torque.

By having an indicator of cup form all within the bore except the indicating bottom surface of the cup, it is protected from accidental damage by an operator applying a wrench to turn the stud.

The tubular housing 66 surrounds the spring 65 with small clearance. If the spring should break after continued use, the pieces cannot fly apart but will be maintained in substantial axial alignment by the housing 66 and continue to exert at least partial braking action, as a feature of safety.

By mounting the magnet 12 above and entirely independent of the spring 65 the magnet can be removed as described without disturbing the adjustment of the spring.

A further advantage results from mounting the magnet casing on the frame as described.

The lower bolts 22—22 are at an angle to the base and draw the magnet casing 13 down rigidly on the frame, and draw the lugs 19 forwardly against the forward walls 20 of the posts 5—5; and the upper bolt 21 draws the top of the casing against the arch 6 at the top of the posts.

The casing itself is a rigid unit, and being drawn tight in this manner it acts like a triangular brace between the frame base and the posts and greatly strengthens the posts against the forces to which they are subjected and prevents yielding or vibrating thereof, which otherwise could not be prevented except by making them much thicker and heavier.

In operation to set the brake, the magnet 12 will be de-energized. The main spring 65 pushes the armature 29 away from the magnet, and rocks the lower end of the lever arm 34 by means of its pivot connection with the armature at the pin 32, and the arm moves the right shoe 35 into contact with the drum; the arm then pivots on the described shoe bearing connection, and the upper end of the arm 34 pulls the tie rod 47 toward the right and thereby rocks the arm 34A on its lower end pivot at the pin 10, which moves the left shoe 35A into contact with the drum. The parts become tight with the tie rod under tension and the full force of the spring effects full braking torque by the shoes.

By adjustably turning the tie rod 47 while keeping it under tension by the main spring 65, to adjustably rock the right arm 34, on the shoe bearing, the working air gap at the lower end of the armature can be brought to a normal designed optimum width say for example ¼".

It will be noted that in front of the collar 49 on the tie rod, is an abutment 72 surrounding the rod, which as will be described later is stationary with respect to the main frame, but may be adjustably positioned along the rod.

At the time of installation before the brake shoe linings wear, the abutment is adjusted to provide a space of say ⅛" between the collar 49 and the abutment 72 when the brake shoes are set and the armature gap ¼" as described. These are optimum desired conditions.

In operation, to retract the shoes 35 and 35A and release the drum, the magnet 12 is energized, and moves the armature 29 until it is stopped on the magnet casing, thus taking up the ¼" gap.

The first movement of the armature at the gap, will rock the arm 34 on the bearing of the right shoe 35 and its upper end will move the tie rod to the left until the collar 49 takes up the ⅛" space between it and the abutment 72 and stops further movement of the rod. This rocks the left arm 34A on its lower end pivot pin 10 and thereby retracts the left shoe 35A from the drum introducing a certain small shoe clearance.

The rest of the ¼" movement of the armature rocks the arm 34 on its top pivot at the pin 39 and this retracts the right shoe 35 from the drum with small clearance.

It is highly desirable for the clearance of the shoes to be at an optimum small value, to insure quick and noiseless setting of the brake.

The clearance, when the shoes are retracted will be at the desired optimum value, if, when the clearance is taken up by movement of the shoes to grip the drum, the said space of ⅛" is present between the collar 49 and the abutment 72.

A simple indicator is provided as follows to indicate this clearance. The said abutment 72 has a horizontal pin 73 therein squared off at its end and extending parallel to the tie rod 47 and close to and overlapping the periphery of the collar 49 and its end is in vertical alignment with the right face 74 of the collar when the said space is ⅛", as an example; and the collar 49 and pin 73 being on top of the brake and in plain view of an attendant, this alignment condition may be readily observed.

The shoe clearance will increase with wear on the shoe liners 53; and when the worn liners have engaged the drum, tie rod 47 will have moved farther to the right and the collar 49 will take up a position farther to the right and make the said space greater than ⅛"; and the end of the pin 73 and the collar face 74 will be observed to be out of alignment.

The extent of this indicated misalignment, will be indication of the wear on the liners and the increase of the clearance beyond optimum value.

To restore the clearance to the optimum value, the tie rod 47 may be rotated to draw the tops of the arms 34 and 34A closer together and until the said space of ⅛" for example, is restored, and this condition will be indicated on the indicator by the concurrent restoration of the said alignment condition.

Upon releasing the shoes from the drum as described the action is rendered more positive and quicker by the rocking of the left arm 34A, independently of movement of the tire rod 47 communicated to it, by the spring 44 acting on the lower end of arm 34A below the bearing 10 as described.

When installing the brake on a floor or other support to brake a drum on the shaft of a motor that has already been installed and is in fixed position, the drum may be in a position at which the shoe clearances are unequal. It would be impracticable to adjust the whole brake structure or the motor on their supports to equalize the clearance, and an equalizer is therefore provided for this purpose.

It comprises a pair of spaced side arms 76 at opposite sides of the rod 47 and its elongated nut element 40, connected at their forward ends by an end wall which is the aforesaid abutment, 72.

The rear ends of the arms 76 carry a split ring clamp 77 which can be contracted by a screw 78.

Figure 19:
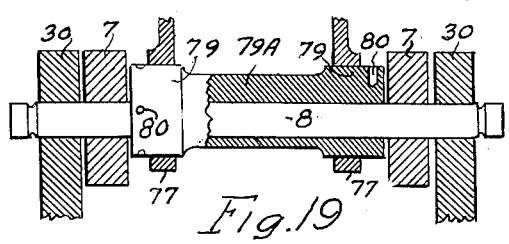
FIG. 19 is a fragmentary sectional view from the plane 19 of FIG. 5.

The clamp 77 surrounds a pair of coaxial cylinders 79—79 connected by a neck 79A, see FIG. 19, and telescoped on and rotatable on the pin 8 supported stationarily on the frame as described. The pin 8 is eccentric to the cylinders 79—79 which therefore rotate as eccentrics.

The eccentrics 79 are provided with peripheral recesses 80 by which they can be rotated on the pin, and within the clamp 77 to adjusted positions by a tool before the clamp is contracted; and by their eccentric action will move the equalizer arms 76 and their said abutment 72 to the right or left to adjustably position the abutment. Then the equalizer arms 76 can be fixed in adjusted position on the pin 8 by contracting the clamp 77 by the screw 78, which fixes the abutment 72 in the adjusted position.

It may at times be desirable to release the shoes from the drum when the magnet is de-energized.

Figure 8:
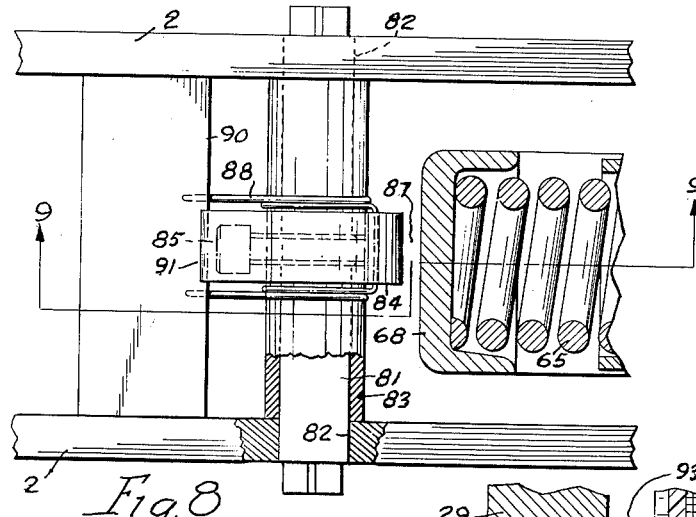
FIG. 8 is a fragmentary view, partly in section, showing a modification which may be applied to the embodiment of FIG. 1.
Figure 9:
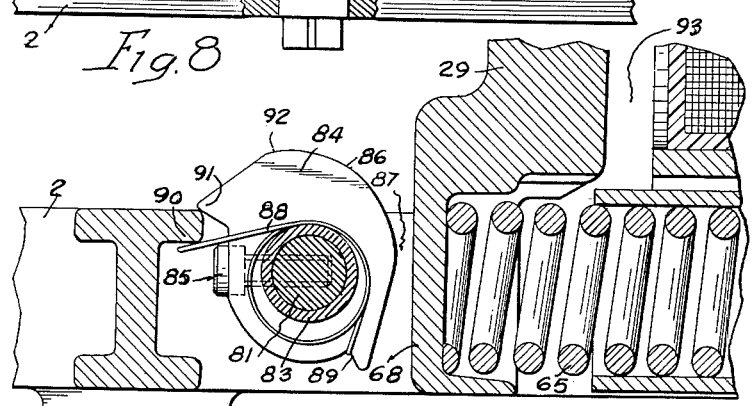
FIG. 9 is a sectional view taken from the plane 9—9 of FIG. 8 with parts of the main embodiment added to illustrate normal positions of operative parts of FIG. 8.
Figure 10:
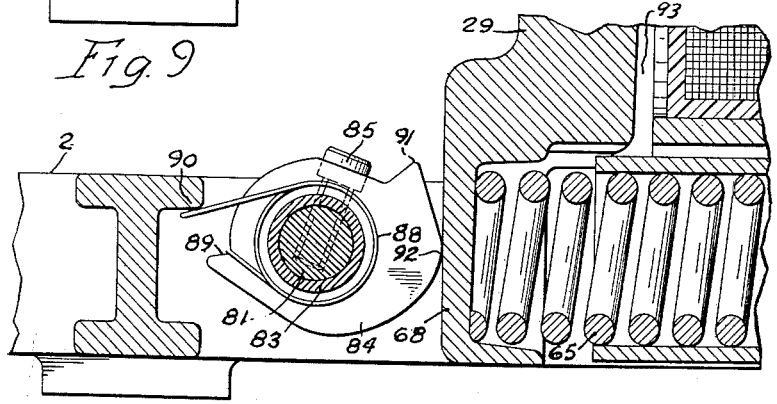
FIG. 10 is a view similar to FIG. 9 showing the operative parts of the modification in operated positions.

Means for doing this is shown in FIGS. 8, 9 and 10, as a modification, as follows.

A cam shaft 81 is supported rotatably in bearings 82 on the main frame rails 2—2; the shaft ends projecting beyond the bearings and being formed to be rotated manually by a tool.

A sleeve 83 fits around the shaft 81, a cam 84 is secured to the shaft by a screw 85 going through the sleeve and threaded into the shaft, and the sleeve abuts at its ends upon the rails 2—2 and prevents endwise shifting of the shaft and cam.

The cam is normally in an out-of-use portion with its periphery 86 adjacent to but spaced from the bottom of the cup form end 68 of the armature 29, as at 87 FIGS. 8 and 9; and tends at all times to rotate counterclockwise to that position by a wire spring 88, coiled around the sleeve 83 and reacting between a notch 89 on the cam and a transverse tie element 90 connecting the rails 2—2; and is stopped in that position by a projection 91 on the cam engaging the tie element 90, FIG. 9.

Upon manually rotating the shaft clockwise, a portion 92 of the cam periphery comes into engagement with the armature cup bottom 68 and cammingly moves it inwardly toward the magnet 12, and is formed to move it far enough to only partly close the magnet air gap 93, as shown in going from FIGS. 8 and 9 to FIG. 10.

The cam spring 88 tends at all times to rotate the cam back to its out-of-use position when manually released but it is held rotated by the friction between its periphery and the armature, caused by the force of the main spring 65, resisting cam-movement of the armature.

When the purposes of manually moving the armature are accomplished, the cam may be rotated manually back to its out-of-use position; but in any event the next energization of the magnet will move its armature through the remainder of the air gap 93, left open intentionally, and away from the cam, interrupting the friction hold on the cam, and it will be returned by its spring to its normal out-of-use position.

We claim:

1. In a brake construction for braking a rotary drum, a main frame; a brake shoe supported by mechanism on the frame at the side of the drum and retractable therefrom upon movement of the armature of an electromagnet connected to the mechanism when the armature moves toward the magnet upon energization thereof; a main spring disposed to move the armature away from the magnet when it is deenergized to thereby cause the shoe to engage the drum; manually operable means for moving the armature toward the magnet to retract the shoe and hold it retracted when the magnet is not energized, comprising a cam mounted to be manually rotated on the main frame from a non-use position to a rotated position to cause a camming periphery thereof to engage and cammingly move the armature toward the magnet against the main spring force; spring means tending to return the cam to non-use position, but held against doing so by friction between the cam periphery and the armature produced by the force of the main spring; the movement of the armature by the cam being less than its total movement by the energized magnet; whereby when the magnet is subsequently energized, it will move the armature and free the cam, by terminating the friction hold thereon and allow it to be returned to non-use position by the said spring means.

2. In a brake for braking rotation of a drum, a main frame; a pair of upright arms at opposite sides of the drum supported on pivots at their lower ends one upon the main frame and the other upon the armature of an electromagnet; and brake shoes pivotally mounted on intermediate portions of the arms; a rotatable rod connecting the upper ends of the arms respectively through right and left screw threads; for adjusting the clearance of the brake shoes with the drum; a collar on the rod; having a plane face in planes of rotation of the rod; a stationary abutment spaced from the collar; an indicating element on the abutment having a portion alignable with the face of the collar; the armature being moved with a predetermined extent of movement by the magnet when energized and retracting both shoes from the drum, and moving the rod to close said collar-to-abutment space; a spring retracting the armature on deenergization of the magnet and moving the shoes to engage the drum and moving the rod to introduce a collar-to-abutment space; the said space being of predetermined extent and the indicating element being aligned with the collar face when the shoe clearance has a desired optimum value, and upon wear of the shoes and increase of clearance, the extent of misalignment caused thereby indicating the increase of clearance.

3. A brake as described in claim 2 and in which increase of clearance caused by wear is reducible by rotating the rod, and the reduction of it to the optimum value will be indicated by alignment of the collar face with the indicating element on the abutment.

4. In a brake construction for exerting brake torque on a drum and releasing it therefrom, a frame; a mechanism on the frame supporting brake shoes; an electromagnet operating the mechanism to retract the shoes from the drum when the magnet is energized; a spring operating the mechanism to engage the shoes with the drum, to exert braking torque thereon when the magnet is deenergized; the spring disposed within the frame beneath the electromagnet means to adjust the force of the spring to increase and decrease the braking torque; said means comprising a rotatable threaded stud in stationary bearing and a nut movable thereon; and a visible indicator having a movable indicator part deriving movement from the movement of the said movable nut, said movable indicator part is disposed in a recess having an opening in the frame, and is projected out of the recess or withdrawn into it by its movement, and indicates the braking torque by its position relative to a stationary face on the frame adjacent to the recess opening.

5. The construction described in claim 4 and in which the indicator part receives movement from the movable nut, and means is provided to adjust its position relative thereto, whereby when the movable nut is moved to adjust the brake torque to a preselected operating value, the indicator will be flush with said stationary face.

6. In an electromagnetic brake construction, a frame comprising an elongated main base adapted to rest upon a floor or the like and including spaced apart side portions and a rear end portion connecting the side portions; a pair of posts extending upwardly from the side portions and spaced from the end portion and joined at their upper portions by a transverse connector; the posts having openings therethrough at lower portions thereof; an electromagnet having a hollow inherently rigid casing enclosing a winding; arms extending upwardly from the connector and pivotally supporting a depending armature forwardly of the magnet casing; the underside of the casing supported by the rear end portion of the frame, and having lugs on opposite sides thereof extending into the post openings and engaging the forward walls of the openings; bolts extending through lugs on the magnet casings in a downward and forward angular direction and threaded into the frame and drawing the casing downwardly rigidly upon the frame and drawing the casing lugs forwardly rigidly against the walls of the post openings; a substantially horizontal bolt extending through a lug on the upper part of the casing and threaded into the said transverse connector, and drawing the casing rigidly against the connector; whereby the magnet casing and the posts provide a rigid unit rigid with the frame, and the magnet casing braces the posts against yielding or vibration in use.

7. In a brake construction for braking rotation of a brake drum, a main frame, a first and second upright arm at opposite sides of the drum, the first one pivoted at its lower end on the armature of an electromagnet, and the second one pivoted at its lower end on the main frame, the arms having respective brake shoes pivoted thereon at their intermediate portions and normally engaged with the opposite sides of the drum; and their upper ends being pivoted to nut elements, and the nut elements having right hand and left hand threads respectively; and a rod screwed at its ends into the nut elements; a collar fixed on the rod normally spaced a predetermined distance from an abutment; the abutment disposed on one end of an elongated equalizing element; a split ring clamp at the other end of the equalizing element; a pin at the top of the main frame; an eccentric rotatably positionable about the pin, and means to fix the eccentric in adjustably rotatable positions; means to operably clamp the split ring on the eccentric in any adjusted position to thereby change the predetermined distance of the abutment from the collar; the armature having a predetermined total movement when the magnet is energized; whereby when the armature moves, it first rocks the first arm on its shoe pivot and thereby moves the rod longitudinally in the direction in which the collar moves towards the stationary abutment and until it is stopped thereon, and the rod rocks the second arm on its lower end pivot and causes it to retract its shoe from the drum with clearance, and the armature then moves the lower end of the first arm and retracts its shoe from the drum with clearance; and the said rod being rotatably at its opposite threaded ends in the nut elements and when rotated concurrently increasing or decreasing said clearance; and the adjustment of said eccentric provides means to equalize the said clearances at the two shoes.

8. In a brake construction for exerting braking torque on a drum and releasing it therefrom, a frame; a mechanism on the frame supporting brake shoes; an electromagnet operating the mechanism to retract the shoes from the drum when the magnet is energized; a helical compression spring for operating the mechanism to engage the shoes with the drum, to exert braking torque thereon when the magnet is de-energized; means to adjust the force of the spring to increase and decrease the braking torque comprising a non-rotating traveling nut abutting on one end of the spring, the nut being propelled on the threads of a stud which is rotatable in stationary bearings on the frame and having a wrench receiving end projecting outwardly from the bearings; a visible indicator for indicating the braking torque comprising a part movable by the nut arm; and the movable indicator part is carried by the indicator element and is disposed in an outwardly open recess in the frame, having a clear face on the frame adjacent to the recess opening; and the indicator part moves relative to the face upon movement of the traveling nut and indicates the braking torque by its position relative to the face; and in which the position of the indicator part is adjustable relative to the nut arm, whereby the indicator will have a predetermined desired indicating position relative to said face, when the traveling nut has been moved to give torque of a preselected value.

9. In a brake construction for braking rotation of a brake drum, a main frame, a first and second upright arm at opposite sides of the drum, the first one pivoted at its lower end on the armature of an electromagnet, and the second one pivoted at its lower end on the main frame; the arms having respective brake shoes pivoted thereon at their intermediate portions and normally engaging with the opposite sides of the drum; and their upper ends being pivoted to nut elements, and the nut elements having right hand and left hand screw threads respectively, and a rod screwed at its ends into the nut elements; means to normally prevent the rod from being rotated in either direction comprising a first lock nut on the rod engaging one of the nut elements and a second lock nut on the rod compressing a spring between it and the other nut element, whereby to make the rod rotatable it is only necessary to disengage the first lock nut from its associated nut element; an abutment stationary with respect to the main frame and a collar fixed on the rod normally spaced a predetermined distance from the abutment; the armature having a predetermined total movement when the magnet is energized; whereby when the armature moves, it first rocks the first arm on its shoe pivot and thereby moves the rod longitudinally in the direction in which the rod moves towards the stationary abutment and until it is stopped thereon, and the rod rocks the second arm on its lower end pivot and causes it to retract its shoe from the drum with clearance, and the armature then moves the lower end of the first arm and retracts its shoe from the drum with clearance; and the said rod being rotatable at its oppositely threaded ends in the nut elements and when rotated concurrently increasing or decreasing the said clearances.

10. In a brake construction for braking rotation of a brake drum, a main frame, a first and second upright arm at opposite sides of the drum, the first one pivoted at its lower end on the armature of an electromagnet, and the second one pivoted at its lower end on the main frame; the arms having respective shoes pivoted thereon at their intermediate portions and normally engaged with the opposite sides of the drum; and their upper ends being pivoted to nut elements, and the nut elements having right hand and left hand screw threads respectively; and a rod screwed at its ends into the nut elements; means to prevent the rod from normally being rotated in either direction comprising a first lock nut on the rod normally engaging the nut element having the right hand threads and a second lock nut on the rod compressing a spring between it and the nut element having the left hand threads, whereby to make the rod rotatable in either direction it is only necessary to disengage the first lock nut from its associated nut element; an abutment stationary with respect to the main frame and a collar fixed on the rod normally spaced a predetermined distance from the abutment; the armature having a predetermined total movement when the magnet is energized; whereby when the armature moves, it first rocks the first arm on its shoe pivot and thereby moves the rod longitudinally in the direction in which the collar moves towards the stationary abutment and until it is stopped thereon, and the rod rocks the second arm on its lower end pivot and causes it to retract its shoe from the drum with clearance, and the armature then moves the lower end of the first arm and retracts its shoe from the drum with clearance; and the said rod being rotatable at its oppositely threaded ends in nut elements and when rotated concurrently increasing or decreasing the said clearances.

References Cited in the file of this patent

UNITED STATES PATENTS

| | | |
|---|---|---|
| 1,231,633 | Mills | July 3, 1917 |
| 1,685,997 | Halfverson | Oct. 2, 1928 |
| 2,009,120 | Price | July 23, 1935 |
| 2,238,100 | Busch | Apr. 15, 1941 |
| 2,436,880 | Burgett | Mar. 2, 1948 |
| 2,545,213 | Schlegel | Mar. 13, 1951 |
| 2,830,682 | Noon | Apr. 15, 1958 |
| 2,851,129 | Doerries | Sept. 9, 1958 |